United States Patent [19]

Berger et al.

[11] 4,314,051
[45] Feb. 2, 1982

[54] PROCESS FOR PREPARING POLYARYLATES

[75] Inventors: Mitchell H. Berger, Somerville; Markus Matzner, Edison; James M. Tibbitt, Lebanon, all of N.J.

[73] Assignee: Union Carbide Corporation, New York, N.Y.

[21] Appl. No.: 146,210

[22] Filed: May 5, 1980

[51] Int. Cl.$^3$ ............................................. C08G 63/00
[52] U.S. Cl. ..................................... 528/179; 528/125; 528/126; 528/128; 528/173; 528/194; 528/206; 528/207; 528/222; 528/225; 528/271
[58] Field of Search ............... 528/173, 179, 206, 207, 528/125, 126, 128, 222, 225, 271, 194

[56] References Cited
U.S. PATENT DOCUMENTS 3,684,766  8/1972  Jackson et al. ..................... 528/179
3,780,148  12/1973  Jackson et al. ..................... 528/179
4,075,173  2/1978  Muruyama et al. ................. 528/179

*Primary Examiner*—Maurice J. Welsh
*Attorney, Agent, or Firm*—Donald M. Papuga

[57] ABSTRACT

Described herein is a process for preparing crystalline polyarylates which comprises (a) forming a crystalline polyarylate prepolymer having a reduced viscosity of from 0.05 to about 0.4 dl/g by reacting at least one diester derivative of a dihydric phenol with at least one aromatic dicarboxylic acid in the presence of a solvent, at a temperature of from about 250° to about 300° C., and (b) heating the prepolymer so formed below its melting point to form a crystalline polyarylate having a reduced viscosity of from about 0.45 to about 1.2 dl/g.

15 Claims, No Drawings

PROCESS FOR PREPARING POLYARYLATES

BACKGROUND OF THE INVENTION

This invention is directed to a process for preparing crystalline polyarylates which comprises: (a) forming a crystalline polyarylate prepolymer having a reduced viscosity of from 0.05 to about 0.4 dl/g by reacting at least one diester derivative of a dihydric phenol with at least one aromatic dicarboxylic acid in the presence of a solvent, at a temperature of from about 250° to about 300° C., and (b) heating the prepolymer so formed below its melting point to form a crystalline polyarylate having a reduced viscosity of from about 0.45 to about 1.2 dl/g.

Polyarylates are polyesters derived from a dihydric phenol, particularly 2,2-bis(4-hydroxyphenyl)propane also identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyarylates. One such process is the diacetate process. In the diacetate process, a dihydric phenol is converted to its diester derivative, which is then reacted with an aromatic dicarboxylic acid to form the polyarylate.

U.S. Pat. No. 3,684,766 issued Aug. 15, 1972, and U.S. Pat. No. 3,780,148 issued Dec. 18, 1973, describe a four step diacetate process for producing polyarylates. In the patented processes, in the first step a prepolymer is formed from, for example, a diacetate, such as Bisphenol-A diacetate, and an aromatic acid, in the presence of a catalyst. In the second step, the prepolymer so formed is comminuted into small particles. In the third step, these particles are contacted with a crystallizing agent to crystallize the polyester. This may be accomplished by placing the particles in a fluidized bed reactor and contacting them with the crystallizing agent in the reactor. The patent states that the crystallizing step is necessary because it increases the melting point of the prepolymers so that the molecular weight can be built up to a satisfactory value without fusing or sticking of the particles. The fourth step involves heating the crystallized bisphenol polyester in the presence of an inert gas, optionally in a fluidized bed, at a temperature below the melting point and for a period of time which is sufficient to achieve an inherent viscosity of at least 0.5 in the final polymer.

The crystallization step described in U.S. Pat. Nos. 3,684,766 and 3,780,148 is a slow, time consuming and expensive operation.

In the process of this invention high molecular weight crystalline polyarylates are achieved without such a crystallization step.

U.S. Pat. No. 4,075,173 issued Feb. 21, 1978, describes the preparation of copolyesters by reacting an aromatic dicarboxylic acid, a diacetate of Bisphenol-A, and an acetate of p-hydroxybenzoic acid. Various processes for producing polyarylates by the reaction of Bisphenol-A and terephthalic and isophthalic acids are reviewed in this patent. The following process for producing polyarylates, identified as route (1), is described in column 2, of the patent:

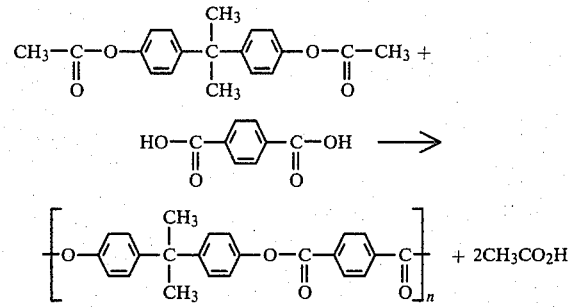

This process is the diacetate process as described herein, or the "Acetate Process" as defined in the patent.

Column 2 of the patent states:

"The route (1) is not desirable because the undesirable coloration and deterioration of polymer are particularly remarkable as disclosed in the abovementioned literature."

Further, column 3 of the patent states:

"On the other hand, the route (1), Acetate process, is economically advantageous because the materials used are cheap and the operation is simple. For example, diacetate of bisphenol-A, a monomer for Acetate process, is synthesized by merely reacting acetic anhydride and bisphenol-A. Consequently, it may be said that, if the fatal drawbacks of Acetate process, coloration and deterioration, are solved, Acetate process will become the most superior process."

Thus, the skilled workers in the field of polyarylate chemistry realize that the existing processes for producing polyarylates have one or more deficiencies, and that a need exists to develop a viable diacetate process for producing polyarylates.

In U.S. Pat. No. 4,075,173, a copolyester was prepared by the diacetate process by a solid-state polymerization of low molecular weight prepolymers without using crystallizing agents. The patentees state that their Acetate process is possible only when specific monomers are combined to form the prepolymer. These monomers are the diacetate of bisphenol-A, terephthalic acid and/or isophthalic acid and an acetate of p-hydroxybenzoic acid. The prepolymer is then converted to the desired high molecular weight polymer by solid state polymerization. Specifically, in the process of said patent, a prepolymer is first prepared by condensing the acetate of p-hydroxybenzoic acid, bisphenol-A diacetate with isophthalic and/or terephthalic acids at a temperature of from 200° to 380° C. for 1 to 10 hours. Catalysts capable of accelerating an ester exchange reaction can be used. The prepolymer is pulverized or pelletized and heated under reduced pressure or in an inert gas to convert it into a high molecular weight polymer.

Thus, as stated in U.S. Pat. No. 4,075,173, the diacetate processes for producing polyarylates are generally unsuitable since they are either economically unattractive and/or produce a commercially unmarketable product. The process of said U.S. Pat. No. 4,075,173 requires the use of p-hydroxybenzoic acid and produces a particular class of polyarylate copolymers. As previously stated, U.S. Pat. Nos. 3,684,766 and 3,780,148 require the use of crystallizing agents in a crystallizing step.

Therefore, a need exists for an economical and practical diacetate process for producing high molecular weight crystalline polyarylates.

U.S. Patent Application Ser. No. 069,818, filed Aug. 27, 1979 in the name of M. H. Berger, et al. and titled "Process For Preparing Polyarylates in the Presence of a Diphenyl Ether" describes a process for preparing polyarylates having a reduced viscosity of from about 0.5 to greater than 1.0 dl/gm, which process comprises reacting at least one diester derivative of a dihydric phenol with at least one aromatic dicarboxylic acid in the presence of from about 10 to about 60 weight percent, based on the polyarylate produced, of a diphenyl ether compound, at a temperature of from about 260° to about 350° C.

U.S. Patent Application Ser. No. 070,039, filed Aug. 27, 1979 in the name of L. M. Maresca, et al. and titled "Process For Preparing Polyarylates in the Presence of a Diphenyl Ether Compound and A Catalyst" describes a process for preparing polyarylates which process comprises reacting a diester derivative of a dihydric phenol with an aromatic dicarboxylic acid in the presence of from about 10 to about 60 weight percent of a diphenyl ether compound at a temperature of from about 260° to about 350° C. and in the presence of a magnesium catalyst.

U.S. Application Ser. No. 069,819, filed Aug. 27, 1979 in the name of M. H. Berger, et al. and titled "Process For Preparing Polyarylates" describes a process for preparing polyarylates of improved color which process comprises reacting a diester derivative of a dihydric phenol with an aromatic dicarboxylic acid in the presence of from about 10 to about 60 weight percent of at least one cycloaliphatic, substituted aromatic or heteroaromatic compound, which compounds contain at least one benzylic and/or tertiary hydrogen atom, at a temperature of from about 260° to about 350° C. Optionally, the process may be carried out in the presence of a magnesium, manganese, or zinc catalyst.

U.S. Patent Application Ser. No. 126,994, filed Mar. 3, 1980 in the name of M. H. Berger, et al. and titled "Process For Preparing Polyarylates" describes a process for preparing polyarylates which process comprises reacting a diester derivative of a dihydric phenol with an aromatic dicarboxylic acid in the presence of from about 10 to about 60 weight percent of at least one halogenated and/or etherated substituted aromatic or heteroaromatic compound, at a temperature of from about 260° to about 350° C.

In said U.S. Patent Application Ser. Nos. 069,818; 070,039; 069,819 and 126,994, supra, reaction of one or more dihydric phenols with an aromatic dicarboxylic acid produces polyarylate polymers or copolymers that essentially do not crystallize during the reaction and recovery steps.

The present process produces polyarylate prepolymers and high molecular weight polyarylate polymers and copolymers which are crystalline.

In the diacetate process for producing polyarylates, problems exist which must be economically and practically solved in order to have a viable, economically attractive process. One problem when a diester derivative of a dihydric phenol is reacted with an aromatic dicarboxylic acid in the molten state is that sublimation of the diacid occurs. This disrupts the stoichiometry of the reaction and the polyarylate produced is not of acceptable molecular weight. To prevent sublimation of the diacid, several techniques have been developed. These include the use of large amounts of solvents together with a variety of catalysts and generally long reaction times in the polymerization process. However, these techniques are quite costly and do not provide an optimum process. Another problem when a diester derivative of a dihydric phenol is reacted with an aromatic dicarboxylic acid in the molten state is that the viscosity of the system increases dramatically towards the end of the reaction and therefore the reaction becomes diffusion controlled (the molecules are not close enough to insure rapid reaction) rather than kinetically controlled. Also, the polymer product is difficult to handle (i.e., removal from the reactor) due to this high viscosity.

Yet another problem in the production of polyarylates by the diacetate process is that a carboxylic acid is a by-product of the reaction of a diester derivative of a dihydric phenol with an aromatic dicarboxylic acid. In order to provide an efficient, economical process and a high molecular weight polyarylate, the acid, for example, acetic acid, has to be conveniently and efficiently removed.

It has now been discovered that crystalline polyarylates can be efficiently and economically produced by the process of this invention.

The utilization of a solvent in preparing a prepolymer in the process of this invention prevents sublimation of the aromatic dicarboxylic acid; thus producing polyarylates of acceptable molecular weight. Also, the solvent provides for better removal of the acetic acid by-product. Further, an additional benefit in using a solvent is that the viscosity of the system is decreased. This decrease in viscosity provides a faster reaction time since better mixing of the reactants occurs which allows the reaction to proceed under kinetic control.

Further, the presence of a solvent during the preparation of the prepolymer allows for the formation of crystallites. After a certain molecular weight is reached, spontaneous crystallization takes place. Thus, a free flowing highly crystalline powder containing the solvent is obtained. This crystalline powder is suitable for further polymerization in the solid phase by heating below its melting point. Therefore, the crystallization step as is required in the process of U.S. Pat. Nos. 3,684,766 and 3,780,148 is thus eliminated.

The unexpected findings of this invention are thus quite important. Typical melt polymerizations are indeed very difficult with high melting, high crystalline polyarylates because of the high temperatures required. Solution polymerizations are difficult due to the general insolubility of crystalline polymers. In contrast, the process of this invention allows easy formation of crystalline intermediates as well as highly crystalline, high melting polyarylates.

DESCRIPTION OF THE INVENTION

The present invention is directed to a process for preparing crystalline polyarylates which comprises: (a) forming a polyarylate prepolymer having a reduced viscosity of from 0.05 to about 0.4 dl/g by reacting at least one diester derivative of a dihydric phenol with at least one aromatic dicarboxylic acid in the presence of a solvent at a temperature of from about 250° to about 300° C., and (b) heating the prepolymer so formed below its melting point to form a crystalline polyarylate having a reduced viscosity of from about 0.45 to about 1.2 dl/g. The polyarylate prepolymer formed in step (a) is in the form of a free-flowing crystalline powder. It is heated below its melting point to form the crystalline polyarylate generally at temperatures of from about 300° to about 350° C.

The polyarylate prepolymer is formed by reacting at least one diester derivative of a dihydric phenol having the following formula:

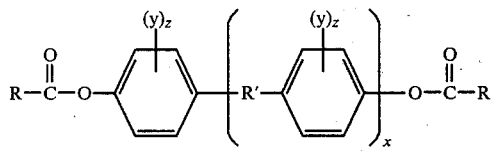

wherein R is independently selected from an alkyl radical having from 1 to about 6 carbon atoms, preferably methyl, cycloalkyl having from 4 to about 7 carbon atoms, y is independently selected from alkyl groups, of 1 to 4 carbon atoms, chlorine or bromine, z independently has a value of from 0 to 4, inclusive, and R' is independently selected from a divalent saturated aliphatic hydrocarbon radical, particularly alkylene or alkylidene radicals having from 1 to 8 carbon atoms, especially $C(CH_3)_2$, cycloalkylene or cycloalkylidene radicals having up to and including 9 carbon atoms, O, S, SO, $SO_2$, and CO, x is 0 or 1; and at least one aromatic dicarboxylic acid.

The diester derivative of the dihydric phenol is prepared by reacting a dihydric phenol with an acid anhydride derived from acids containing from 2 to 8 carbon atoms under conventional esterification conditions. The preferred acid anhydride is acetic anhydride. Generally, the dihydric phenol is reacted with the acid anhydride in the presence of an esterification catalyst, either in the presence or absence of a solvent. However, this reaction may also be conducted in the absence of a catalyst.

The dihydric phenols that may be used in this invention include the following:
2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxphenyl)heptane,
1,2-bis-(4-hydroxyphenyl)-1,2-bis-(phenyl)-propane,
4,4'-(dihydroxyphenyl)ether,
4,4'-(dihydrophenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

These dihydric phenols may be used individually or in any combination which when reacted with an aromatic dicarboxylic acid produce polyarylate prepolymers which are crystalline. The preferred dihydric phenol is 2,2-bis(4-hydroxyphenyl)propane.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents such as halides, alkyl or aryl ethers, and the like. Preferably, mixtures of isophthalic and terephthalic acids are used. The isophthalic acid to terephthalic acid ratio is within the ranges of from about 0:100 to about 25:75, and 85:15 to 100.0. The preferred ranges are from about 10:90 to about 0:100 and from about 90:10 to 100:0. Also, from about 0.5 to about 20 percent of aliphatic diacids containing from 2 to about 10 carbon atoms, such as adipic acid, sebacic acid, and the like may be additionally used in the polymerization reaction.

The polyarylate prepolymer having a reduced viscosity of from 0.05 to about 0.4 dl/g is prepared by reacting at least one diester derivative of a dihydric phenol with at least one aromatic dicarboxylic acid in the presence of a solvent at a temperature of from about 250° to about 300° C., preferably from about 275° to about 295° C. The preparation of the polyarylate prepolymer is generally conducted in an inert atmosphere (such as argon or nitrogen). The process is carried out either under atmospheric pressure, under vacuum or under positive pressure such that the solvent is refluxing at the reaction temperature.

The polymerization reaction is conducted for a period of time sufficient to produce a polyarylate having a reduced viscosity of from 0.05 to about 0.4 dl/g, which time is generally less than about 10 hours. The reaction time is generally in the range of from about 4 hours to about 8 hours, depending on the particular polyarylate being prepared.

The polymerization reaction of this invention may be carried out batchwise or continuously and by using any apparatus desired. Moreover, the reactants may be added to the polymerization zone in any way or order desired.

The preparation of the polyarylate prepolymer is carried out in the presence of from about 10 to about 60, preferably from about 25 to about 60, and most preferably, from about 30 to about 60 weight percent, based on the weight of the polyarylate prepolymer produced of an organic solvent.

The preferred organic solvents are a diphenyl ether compound as described in U.S. Patent Application Ser. No. 069,818, supra, a cycloaliphatic substituted aromatic or heteroaromatic compound, as described in U.S. Patent Application Ser. No. 069,818, supra, and a halogenated and/or etherated substituted aromatic or heteroaromatic compound, as described in U.S. Patent Application Ser. No. 126,994, supra, or mixtures of these.

The diphenyl ether compound, as described in U.S. Patent Application Ser. No. 069,818, supra, may be substituted. These substituents are selected from alkyl groups, chlorine, bromine or any substituent which does not interfere with the polyarylate forming reaction or the reaction forming the diester derivative of the dihydric phenol. Additionally, the diphenyl ether compound may be used with up to 50 weight percent of other compounds, such as various biphenyls or any other compounds which do not interfere with the polyarylate forming reaction or the reaction forming the diester derivative of the dihydric phenol.

The cycloaliphatic compounds, or substituted aromatic or heteroaromatic compounds, as described in U.S. Patent Application Ser. No. 069,818, supra, contain at least one benzylic and/or tertiary hydrogen atoms. These compounds have a boiling point of about 150° to about 350° C., preferably from about 180° to about 280° C., and most preferably from about 180° to about 220° C., at atmospheric pressure. Additionally, these compounds have a solubility parameter, at a temperature of 250° C., of ±4 within the solubility parameter of the polyarylate being produced. Solubility parameter is a measure for correlating polymer solvent interaction. It is defined in "Properties of Polymers", D. W. Van Krevelen, Elsevier Scientific Publishing Co., Amsterdam-Oxford-New York, 1976, pp. 141-155, as the square root of the cohesive energy density.

The cycloaliphatic compounds are of the following formulae:

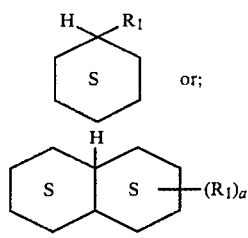

wherein $R_1$ is independently alkyl of 1 to 6 carbon atoms, cycloalkyl of 6 to 18 carbon atoms, and a is an integer of 1 or 2.

The substituted aromatic compounds are of the following formulae:

wherein $R_2$ is independently alkyl of 1 to 6 carbon atoms, cycloalkyl of 6 to 18 carbon atoms and aralkyl or alkaryl of 7 to 18 carbon atoms and wherein the carbon atom of $R_2$ attached directly to the benzene nucleus has 1 or 2 attached hydrogen atoms, and b is an integer or 1 to 6.

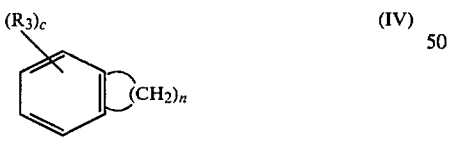

wherein $R_3$ is independently alkyl of 1 to 6 carbon atoms, cycloalkyl of 6 to 18 carbon atoms, c is an integer of 1 or 2, and n is an integer of 1 to 6

The heteroaromatic compounds are of the following formula:

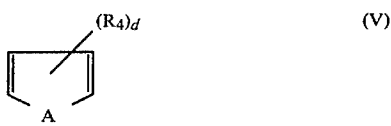

wherein A is S, O, or —CH=N—, $R_4$ is independently alkyl of 1 to 6 carbon atoms, or cycloalkyl of 6 to 18 carbon atoms and wherein the carbon atom of $R_4$ attached directly to the heteroaromatic nucleus has 1 or 2 attached hydrogen atoms, and d is an integer of 1 to 4.

The preferred compounds encompassed by structures (I) through (V) include xylenes, cumene, diethylbenzene, diisopropyl benzene, tetrahydronaphthalene or decahydronaphthalene.

Additionally, the cycloaliphatic, substituted aromatic or heteroaromatic compounds may be used with up to 90 weight percent of other compounds such as diphenyl ether, dimethylsulfone, etc.

The halogenated and/or etherated substituted aromatic or heteroaromatic compounds, as described in U.S. Patent Application Ser. No. 126,994, supra, are of the formulae:

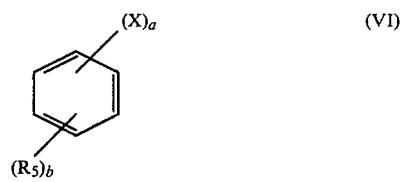

wherein X is independently Cl, Br, F, or $OR_6$, a is an integer of 1 to 5, $R_5$ is independently alkyl of 1 to 16 carbon atoms, cycloalkyl of 6 to 18 carbon atoms, aryl of 6 to 18 carbon atoms, or aralkyl or alkaryl of 7 to 18 carbon atoms, $R_6$ is independently alkyl of 1 to 16 carbon atoms or cycloalkyl of 6 to 18 carbon atoms, and b is integer of 0, 1, or 2;

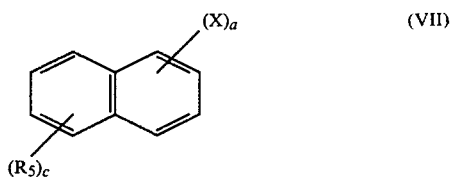

wherein X, $R_1$ and a are as previously defined, and c is an integer of 0 to (8-a).

The heteroaromatic compounds are of the following formula:

wherein A is O, S, or —CH=N—, and $R_5$ are as previously defined, d is an integer of 1 to 4 and f is integer of 0 to (4-d).

The compounds encompassed by structures (VI) through (VIII) include 1,2,3-trichlorobenzene; 1,2,4-trichlorobenzene, 1,2- or 1,3- or 1,4-dichlorobenzene; 1,2,3- or 1,2,4- or 1,3,5-trimethoxybenzene; 1,2- or 1,3- or 1,4-dibromobenzene; chlorobenzene; bromobenzene; 1-chloronaphthalene; 2-chloronaphthalene; 1-bromonaphthalene; 2-bromonaphthalene; 1,2- or 1,3- or 1,4-dimethoxybenzene; 2-bromotoluene; 2-chlorotoluene; 4-bromotoluene; 4-chlorotoluene; anisole; 2-methylanisole; 3-methylanisole; 4-methylanisole; 2-chloroanisole; 3-chloroanisole; 4-chloroanisole; 2-bromoanisole; 3-bromoanisole and 4-bromoanisole.

Additionally, the halogenated and/or etherated substituted aromatic or heteroaromatic compounds may be used with up to 90 weight percent of other compounds such as diphenyl ether, dimethylsulfone, etc.

The amount of said solvents could vary during the polymerization reaction. For example, it may be advantageous to increase progressively the amount of these solvents to maintain the reaction medium at constant viscosity.

A catalyst may be used to accelerate the rate of polyarylate prepolymer formation. All the conventional catalysts capable of accelerating an ester exchange reaction are suitable for use herein. These include metal salts, generally the Group VII and VIII metal salts, such as magnesium, manganese or zinc salts. The salts are generally organic acid salts and include acetates, propionates, benzoates, oxylates, acetylacetonates, or mixtures thereof. A preferred catalyst is magnesium acetate. The catalyst is present in the reaction in a catalytically effective amount which can be, for example, from about 1 to about 1000, preferably from about 10 to about 50, parts per million, based on the weight of the polyarylate prepolymer produced.

The diester derivative of the dihydric phenol may be formed, in situ, by adding the dihydric phenol together with the acid anhydride, an aromatic dicarboxylic acid and solvent to the reactor and the reaction carried out in a single reaction zone under combined esterification and polymerization conditions as described above. Additionally, the diester derivative of the dihydric phenol may be first prepared in the presence or absense of solvent, and then an aromatic dicarboxylic acid, and optionally, a solvent added directly to the same reaction vessel, with the polymerization being carried out under the conditions described above.

The polyarylate prepolymer produced is generally in the form of a free-flowing crystalline powder containing the solvent. It is a crystalline powder in that it displays patterns characteristic of crystallinity under x-ray diffraction and it has a well defined melting point which is a characteristic of its crystallinity.

In the second step of the process of this invention, the polyarylate prepolymer as prepared above, is heated below its melting point to form a crystalline polyarylate having a reduced viscosity of from about 0.45 to about 1.2 dl/g.

The heating step may be accomplished in many different ways. The polyarylate prepolymer may be heated in the reaction vessel below its melting point generally from about 300° to about 350° C. in an inert atmosphere in order to increase its molecular weight to the desired level. Alternatively, the polyarylate prepolymer may also be heated below its melting point under reduced pressure, or in a fluid bed reactor. The parameters for advancing molecular weight depend upon a number of factors, such as the initial reduced viscosity, the final reduced viscosity desired and the particular polyarylate. Nitrogen is the preferred fluidization gas, but other inert gasses may be used.

Generally, the polyarylate prepolymer is heated from about 0.5 to about 8 hours.

The process of this invention produces crystalline polyarylates having a reduced viscosity of from about 0.45 to greater than about 1.2, preferably from about 0.6 to about 0.8 dl/gm, as measured in an appropriate solvent such as p-chlorophenol, m-cresol, or others known in the art (0.2 g/dl at 49° C.).

The polyarylates may be prepared in the presence of materials such as molecular weight regulators, antioxidants, and the like.

The polyarylate obtained by the process of this invention may be used together with the well-known additives such as plasticizers, pigments, lubricating agents, mold release agents, stabilizers, inorganic fillers, and the like.

EXAMPLES

The following examples serve to give specific illustrations of the practice of this invention but they are not intended in any way to limit the scope of this invention. In these examples, all parts and percentages are on a weight basis unless otherwise specified.

COMPARATIVE EXAMPLE A

Preparation of Prepolymer

The apparatus used herein consisted of a 500 ml round bottom flask fitted with a nitrogen inlet, mechanical stirrer, a vacuum jacketed vigreux column connected to a distillation head and collector flask. 124.8 grams of bisphenol-A diacetate, 33.2 grams of isophthalic acid, 33.2 grams of terephthalic acid, and 63 grams of diphenyl ether were added to the flask. The reaction mixture was purged with nitrogen for about 20 minutes. The reaction mixture was then heated to about 275° C. by immersion of the apparatus in a heating medium. Acetic acid started to distill when the temperature reached about 260° C. The reactants were maintained at 275° C. for 2 hours. The temperature was then raised to about 290°-295° C. and the reactants maintained at this temperature for 2 hours. No apparent distillation of acetic acid was observed during the last hour. A clear yellow product formed. This was allowed to cool to ambient temperature.

Approximately 3 grams of the product was dissolved in methylene chloride (approximately 10 percent solids) and coagulated in isopropanol. The resultant material, which was in the form of a fluff, was washed with isopropanol two times and then dried at 120° C. (for 24 hours at <1 mm Hg pressure). The reduced viscosity of this polymer was 0.25 dl/gm as measured in chloroform (0.50 gm/100 ml at 25° C.).

Preparation of Polymer

To a test tube (25 by 200 mm.) fitted with a vacuum adapter, was added 6 grams of the prepolymer as prepared above. The pressure in the test tube was reduced to <0.4 millimeters Hg. After two minutes at ambient temperature, the test tube was heated to 345°-350° C., and the prepolymer was maintained at this temperature for about 30 minutes. It appeared as a foaming mass. The test tube was allowed to cool to ambient temperature. The polymer was recovered by breaking the test tube. The solid material recovered had a deep yellow color. The reduced viscosity of this polymer was 0.70 dl/gm as measured in chloroform (0.50 gm/dl at 25° C.).

EXAMPLE 1

Preparation of Prepolymer

To the apparatus described in Comparative Example A was added 124.8 grams of bisphenol-A diacetate, 16.6 grams of isophthalic acid, 49.8 grams of terephthalic acid and 60 grams of diphenyl ether. The resulting mixture was purged with nitrogen for 20 minutes. The mixture was then heated to about 275° C. Distillation of acetic acid started when the reaction temperature reached about 260° C. The reaction mixture was heated to about 275° C. and maintained at this temperature for about 2 hours and then heated to about 290°–295° C. and maintained at this temperature for about 2 hours. No apparent distillation of acetic acid occurred during the last hour. The thick yellow product formed was cooled to ambient temperature. The product displayed a yellow opaque color.

Attempts to dissolve the prepolymer in methylene chloride were not successful. This resulted in a slurry of the prepolymer in the solvent. The material was soluble in chloroform and the reduced viscosity was measured therein and found to be 0.21 dl/g.

The opaque nature of the prepolymer was indicative of a crystalline material.

Preparation of Polymer

The procedure described in Comparative Example A for preparing a polymer from a prepolymer was exactly repeated with the prepolymer formed above. The polyarylate produced had a reduced viscosity of 0.80 dl/g as measured in chloroform (0.50 gm/dl at 25° C.).

The prepolymer prepared in Comparative Example A was formed into a polymer by heating it at 300°, 320° and 350° C. The prepolymer prepared in Example 1 was formed into a polymer by heating it at 320° and 350° C. The procedure as described in Comparative Example A was used to form the polymer. The prepolymers were heated at said temperatures for 30 minutes to advance their molecular weight (hereinafter described as advancement temperature).

The amount and percent of terephthalic acid used to prepare the polymer, the reduced viscosity of the prepolymer, the advancement temperature, the reduced viscosity of the polymer, and the physical state of the polymer are shown in Table I.

EXAMPLES 2 to 7

The procedure as described in Example 1 for forming a prepolymer was exactly repeated except that the amounts of terephthalic and isophthalic acids shown in Table II were charged to the reaction vessel. The prepolymer was then formed into a polymer by the procedure as described in Comparative Example A.

Table II shows the weight in grams of the terephthalic and isophthalic acids used, the mole percent terephthalic acid used, based on the total amount of acid used, the reduced viscosity of the prepolymer, the advancement temperature (the polymer was advanced at this temperature for 30 minutes), the reduced viscosity of the polymer formed, the physical state of the polymer formed, and the melt transition temperature of the polymer as measured by differential scanning colorimetry. Du Pont Model 990 at 5° C./minute. The melting point is a function of molecular weight and degree of crystallinity.

TABLE II

| Example | ACID Terephthalic (wt. %) | Isophthalic (wt. %) | Terephthalic (mol. %) | Reduced viscosity of the prepolymer[1] (dl/g) | Advancement Temperature (°C.) | Reduced viscosity of the polymer[1] (dl/g) | Physical State | Melt Transition Temperature (°C.) |
|---|---|---|---|---|---|---|---|---|
| 2 | 49.8 | 16.6 | 75 | 0.21 | 325 | 0.48 | crystalline | 335 |
|   |      |      |    |      | 350 | 0.79 | amorphous   | —   |
| 3 | 53.12 | 13.28 | 80 | 0.21 | 350 | 0.63 | crystalline | 365 |
| 4 | 106.2 | 26.6 | 80 | 0.23 | 350 | 0.67 | crystalline | 359 |
| 5 | 56.4 | 10.0 | 85 | 0.22 | 350 | 0.81 | crystalline | 395 |
| 6 | 112.8 | 200 | 85 | 0.34 | 350 | 0.75 | crystalline | 387 |
| 7 | 66.4 | — | 100 | 0.33 | 350 | 0.44 | crystalline |     |
|   |      |   |     |      | 350[2] | 0.61 | crystalline | >400[3] |

[1] all reduced viscosities measured in p-chlorophenol (0.20 gm/100 ml.) at 49° C.
[2] held at this temperature for 2 hours.
[3] The melting point could not be located. The material was unchanged at 400° C.

COMPARATIVE EXAMPLE B

Formation of Prepolymer

The procedure of Example 1 was exactly repeated using the materials of Example 5, i.e., 124.8 grams of bisphenol-A diacetate, 56.4 grams of terephthalic acid, and 10 grams of isophthalic acid, except that no diphenyl ether solvent was used. The prepolymer formed had a reduced viscosity of 0.31 dl/g as measured in p-chlorophenol (0.20 gm/100 ml, at 49° C.).

Preparation of Polymer

The procedure described in Comparative Example A for forming a polymer from a prepolymer was exactly repeated except that the prepolymer was heated at 350° C. for 30 minutes. The polymer formed was non-homogeneous. It was a partially crystalline, partially foamed, and partially sintered mass. It had a reduced viscosity of

TABLE I

| Example | Terephthalic Acid Amount (grams) | Percent | Reduced viscosity of the prepolymer (dl/g) | Advancement Temp. (°C.) | Reduced viscosity of the polymer (dl/g) | Physical state[c] |
|---|---|---|---|---|---|---|
| Comparative Example A | 33.2 | 50 | 0.25[a] | 300 | 0.45[a] | foam/amorphous |
|   |      |    |         | 320 | 0.50[a] | foam/amorphous |
|   |      |    |         | 350 | 0.70[a] | foam/amorphous |
| 1 | 49.8 | 75 | 0.20[b] | 320 | 0.48[b] | solid state/crystalline |
|   |      |    |         | 350 | 0.80[a] | foam/amorphous |

[a] measured in chloroform (0.50 gm/100 ml) at 25° C.
[b] measured in p-chlorophenol (0.20 gm/100 ml) at 49° C.
[c] This is a qualitative assessment. An amorphous melt foams under the experimental conditions.

0.47 dl/g as measured in p-chloroform (0.20 gm/100 ml, at 49° C.).

This Example shows that the presence of diphenyl ether (Example 5) allows the prepolymer to reach a higher degree of crystallinity while the absence of diphenyl ether in the preparation of the prepolymer (this Example) produces a semi-crystalline, semi-amorphous polymer which would be difficult to process.

backbone architecture, it is also a measure of the degree of crystallinity, i.e., the greater the $\Delta H_f$, the more crystalline the polymer. The heat of fusion is proportional to the area under the melting transition curve as recorded by the Differential Scanning Colorimeter.

This Example demonstrates that the treatment with chlorobenzene has no effect on the crystallinity of the polymer.

TABLE III

| Treatment with Chlorobenzene | Reduced viscosity of the Prepolymer (dl/g) | Advancement Temperature (°C.) | Reduced viscosity of the Polymer (dl/g)[1] | Melt Transition Temperature | Heat of fusion (calories/gram) |
|---|---|---|---|---|---|
| No | 0.32 | 350 | 1.0 | 395 | 4.2 |
| Yes | 0.32 | 350 | 1.05 | 391 | 4.0 |

[1]The produced polymer remained a solid in both cases.

EXAMPLE 8

Preparation of Prepolymer

The reactor system consisted of an oil heated one gallon stainless steel reactor fitted with a nitrogen inlet, mechanical agitator, and fractionating column (packed with ceramic saddles) connected to an overhead take-off device consisting of a reflux splitter condenser and a collection device.

The reactor was charged 1200 grams of Bisphenol-A diacetate, 95.7 grams of isophthalic acid, 542.5 grams of terephthalic acid and 740 grams of diphenyl ether (35 weight percent based on polymer). The reactor system was purged with nitrogen for 20 minutes. The oil heater was turned on to raise the temperature of the reactor to about 280° C. (oil temperature was about 300° C.). Acetic acid started to distill when the temperature reached about 260° C.

After about 2 hours at reflux conditions, the agitator stalled. The reactor could not be discharged. After cooling to ambient temperature, one gallon of chlorobenzene was charged to the reactor. The reactor was heated to 180° C. under a nitrogen pressure of 50 psig. After about 15 minuts, the agitator was started, the pressure dropped and the chlorobenzene began to distill off. After about 60 minutes, the reactor was cooled and a free flowing particulate material was recovered. It had a reduced viscosity of 0.32 dl/g as measured in p-chlorophenol (0.20 gm/100 ml, 49° C.).

Preparation of Polymer

The procedure as described in Example 1 for preparing a polymer from a prepolymer was exactly repeated except that the prepolymer was heated at 350° C. for 30 minutes. Samples before and after chlorobenzene treatment of the prepolymer, as described above, were advanced.

Table III shows the reduced viscosity of the prepolymer, the advancement temperature, the reduced viscosity of the polymer, the melt transition temperature, and the heat of fusion. Heat of fusion ($\Delta H_f$) is a measure of the enthalpy difference between the crystalline and amorphous state. For a series of polymers with a given

EXAMPLE 9

100 grams of the prepolymer prepared in Example 8 was placed in a 500 milliliter round bottom flask. The flask was placed on a rotary evaporator and a vacuum applied (0.5 to 1.0 millimeter Hg). The flask was heated at 340°-350° C. for one hour and rotated during this period. A free flowing polymer was recovered. It had a reduced viscosity of 0.61 dl/gm as measured in p-chlorophenol (0.02 gm/100 ml, at 49° C.).

EXAMPLES 10 to 13

4 grams of the prepolymer prepared in Example 8 were placed in a fluid bed reactor. The prepolymer was fluidized with nitrogen gas preheated to the temperature and at the gas velocity, standard cubic feet per minute (SCFM) shown in Table IV.

Table IV also shows the fluid bed temperature, time of advancement of the prepolymer, the reduced viscosity of the polymer formed (measured in p-chlorophenol, 0.02 gm/100 ml, at 49° C.) and the physical state of the polymer.

TABLE IV

| Example | Gas velocity (SCFM) | Gas Temp. (°C.) | Fluid Bed Temp. (°C.) | Time of Advancement (min.) | Reduced Viscosity of the Polymer (dl/g) | Physical State |
|---|---|---|---|---|---|---|
| 10 | 21.2 | 345 | 330 | 20 | 0.60 | slightly sintered |
| 11 | 11.5 | 286 | 265 | 20 | 0.55 | solid state |
| 12 | 4.25 | 313 | 290 | 20 | 0.58 | solid state |
| 13 | 21.0 | 360 | 350 | 30 | 0.91 | sintered |

What is claimed is:

1. A process for preparing crystalline polyarylates which comprises
   (a) forming a crystalline polyarylate prepolymer having a reduced viscosity of from 0.05 to about 0.4 dl/g by reacting at least one diester derivative of a dihydric phenol having the following formula:

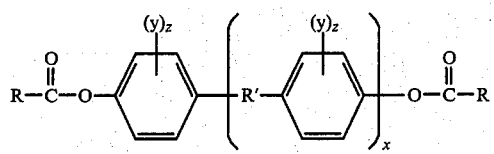

wherein R is independently selected from an alkyl radical having from 1 to about 6 carbon atoms or cycloalkyl having from 4 to about 7 carbon atoms, y is independently selected from alkyl groups of 1 to 4 carbon atoms, chlorine, or bromine, z independently has a value of from 0 to 4 inclusive, and R' is independently selected from a divalent saturated aliphatic hydrocarbon radical having 1 to 8 carbon atoms, a cycloalkylene or cycloalkylidene radical having up to and including 9 carbon atoms, O, S, SO, SO$_2$, CO, x is 0 or 1; with at least one aromatic dicarboxylic acid in the presence of a solvent at a temperature of from about 250 to about 300° C.; and (b) heating the crystalline polyarylate prepolymer formed in step (a) below its melting point to form a crystalline polyarylate having a reduced viscosity of from about 0.45 to about 1.2 dl/g.

2. A process as defined in claim 1, wherein the diester derivative of a dihydric phenol has the following formula:

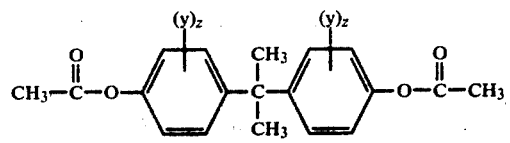

3. A process as defined in claim 2 wherein each z is 0.

4. A process as defined in claim 1 wherein the aromatic dicarboxylic acid is a mixture of isophthalic acid and terephthalic acid.

5. A process as defined in claim 4 wherein the isophthalic acid to terephthalic acid ratio in the mixture is about 0:100 to about 25:75.

6. A process as defined in claims 4 or 5 wherein the isophthalic to terephthalic acid ratio in the mixture is about 85:15 to about 100:0.

7. A process as defined in claim 1 wherein the solvent is selected from a diphenyl ether compound, a cycloaliphatic compound or a substituted aromatic or heteroaromatic compound, and a halogenated and/or etherated substituted aromatic or heteroaromatic compound, or mixtures thereof.

8. A process as defined in claims 1 or 7, wherein the solvent is present in an amount of from about 10 to about 60 weight percent, based on the weight of the polyarylate prepolymer produced.

9. A process as defined in claims 1 or 7, wherein the solvent is present in an amount of from about 25 to about 60 weight percent, based on the weight of the polyarylate prepolymer produced.

10. A process as defined in claim 1, wherein a catalytically effective amount of a catalyst capable of accelerating an ester exchange reaction is used in step (a).

11. A process as defined in claim 1, wherein the polyarylate prepolymer produced is in the form of a free flowing powder.

12. A process as defined in claim 1, wherein the polyarylate prepolymer is heated in step (b) below its melting point under reduced pressure.

13. A process as defined in claim 1, wherein the polyarylate prepolymer is fluidized and heated in step (b) below its melting point.

14. A process as defined in claims 1, 12 or 13 wherein the polyarylate prepolymer is heated at a temperature of from about 300 to about 350° C. in step (b).

15. The crystalline, solvent containing solidified prepolymer as prepared in step (a) of claim 1.

* * * * *